C. GABRIEL.
MACHINE FOR DISHING AND FLANGING PLATES.
APPLICATION FILED MAR. 20, 1908.
942,062.
Patented Dec. 7, 1909.
8 SHEETS—SHEET 1.
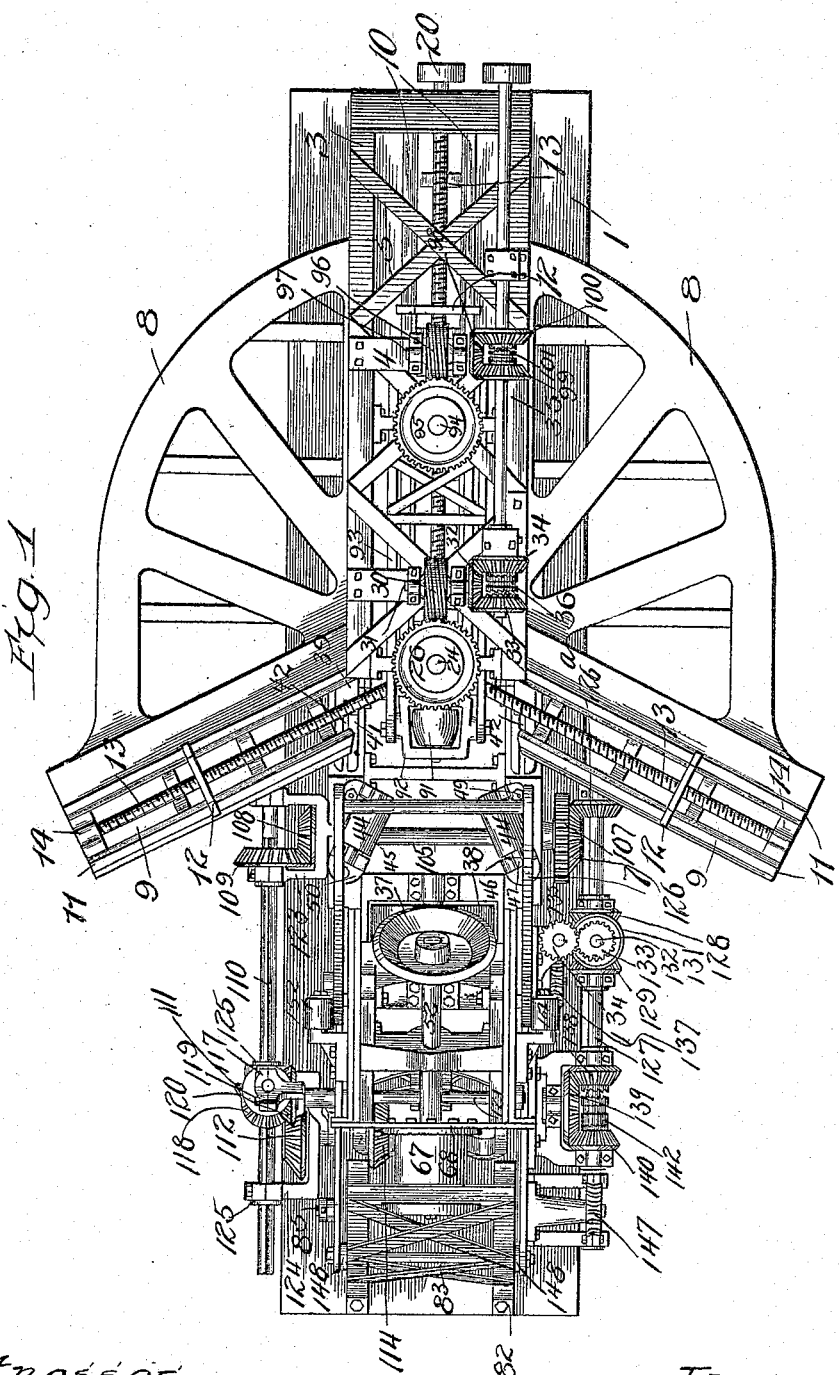
Witnesses
Harry R. L. White.
Ray White.
Inventor
Charles Gabriel
By Rudolph Wm. Lotz
Atty.

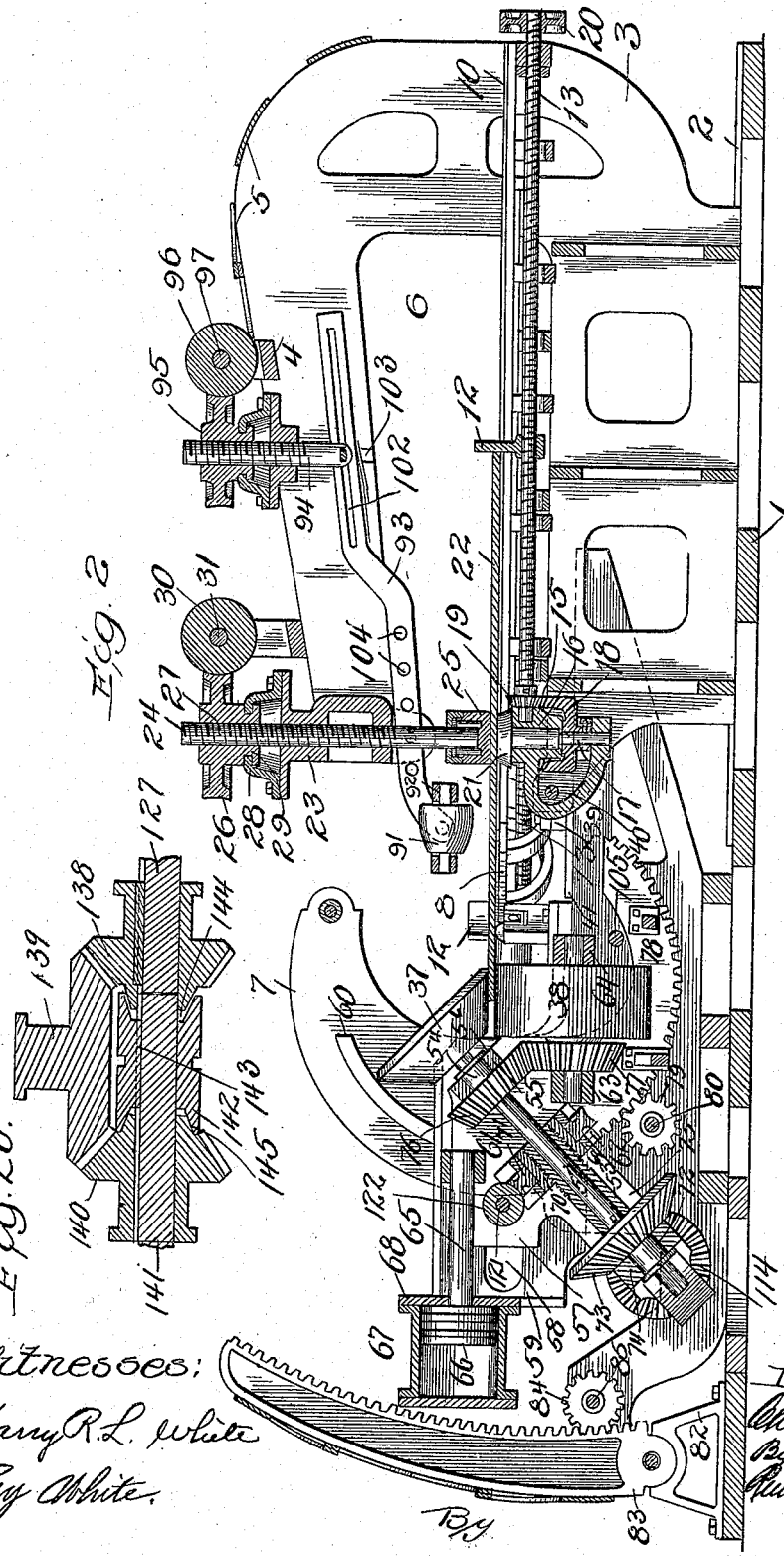

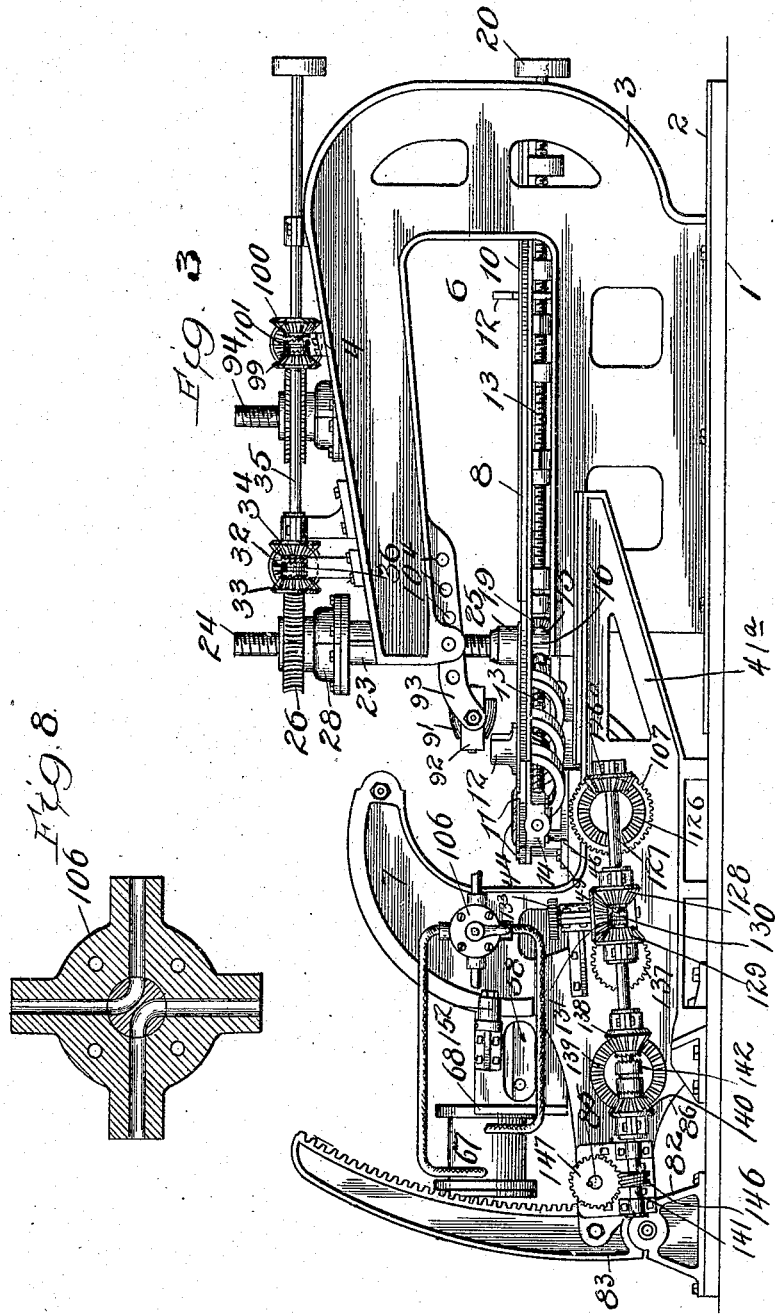

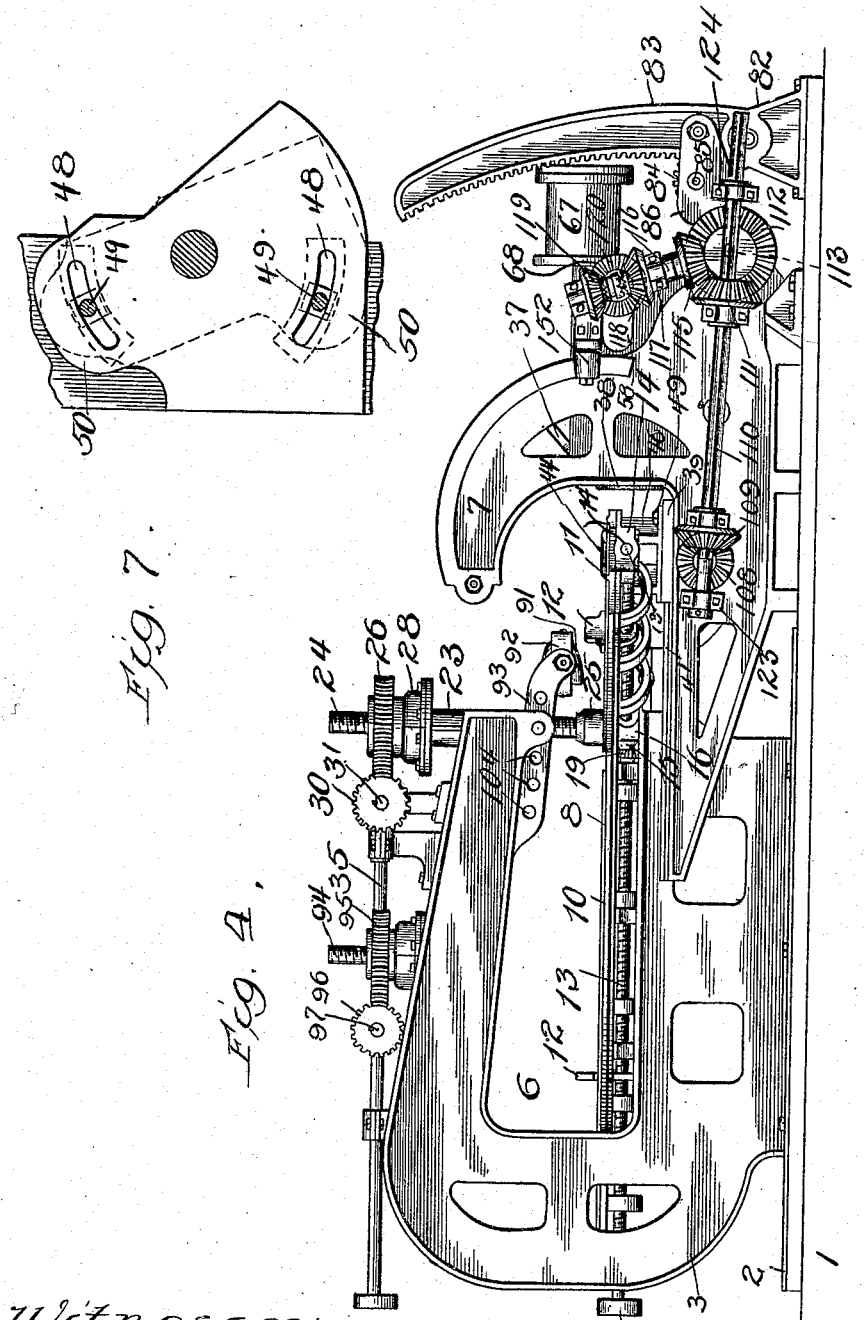

C. GABRIEL.
MACHINE FOR DISHING AND FLANGING PLATES.
APPLICATION FILED MAR. 20, 1908.
942,062.
Patented Dec. 7, 1909.
8 SHEETS—SHEET 5.
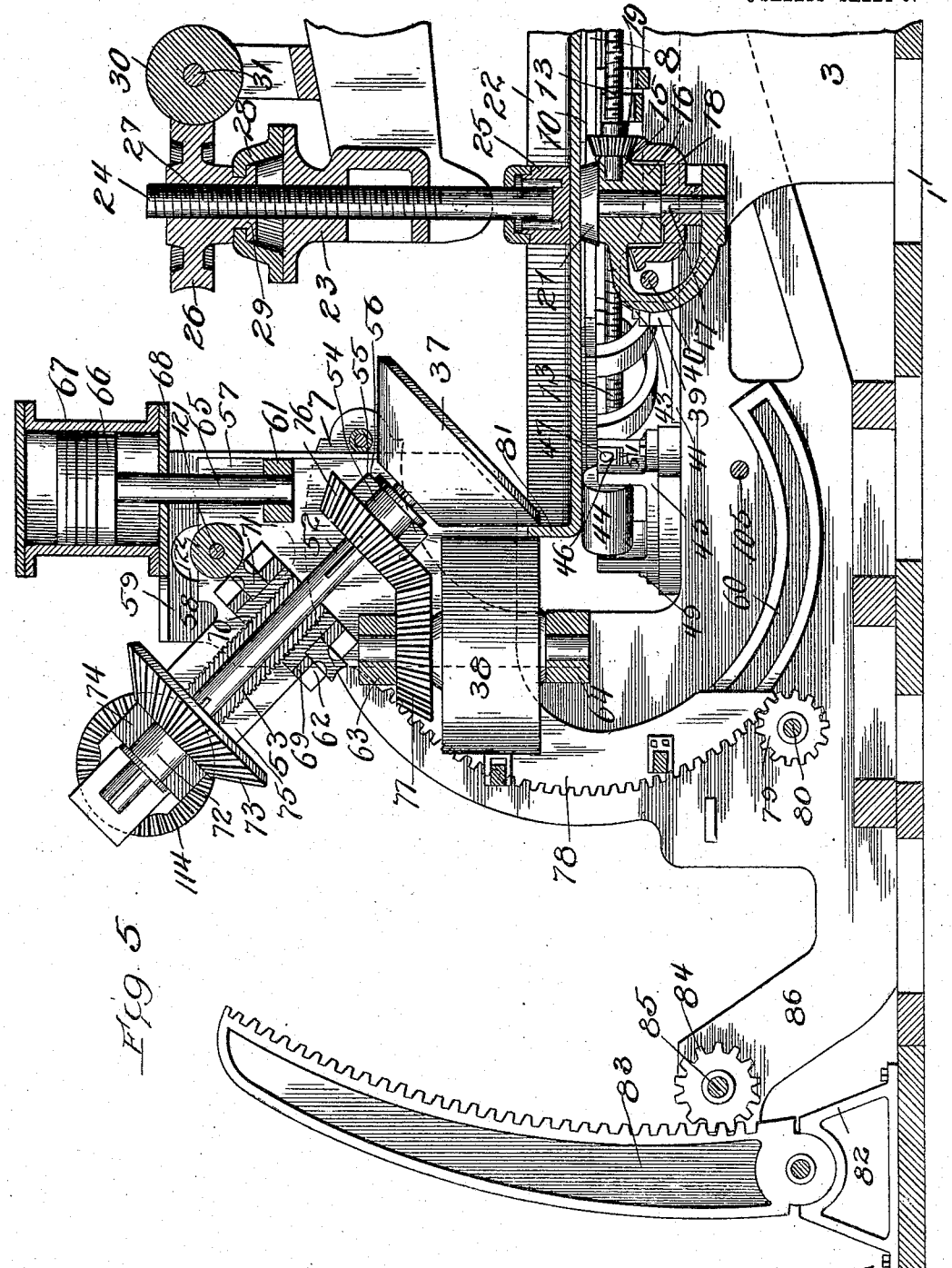
Witnesses:
Harry R. L. White
Ray White.
Inventor
Charles Gabriel
By Rudolph M. Hoff Atty

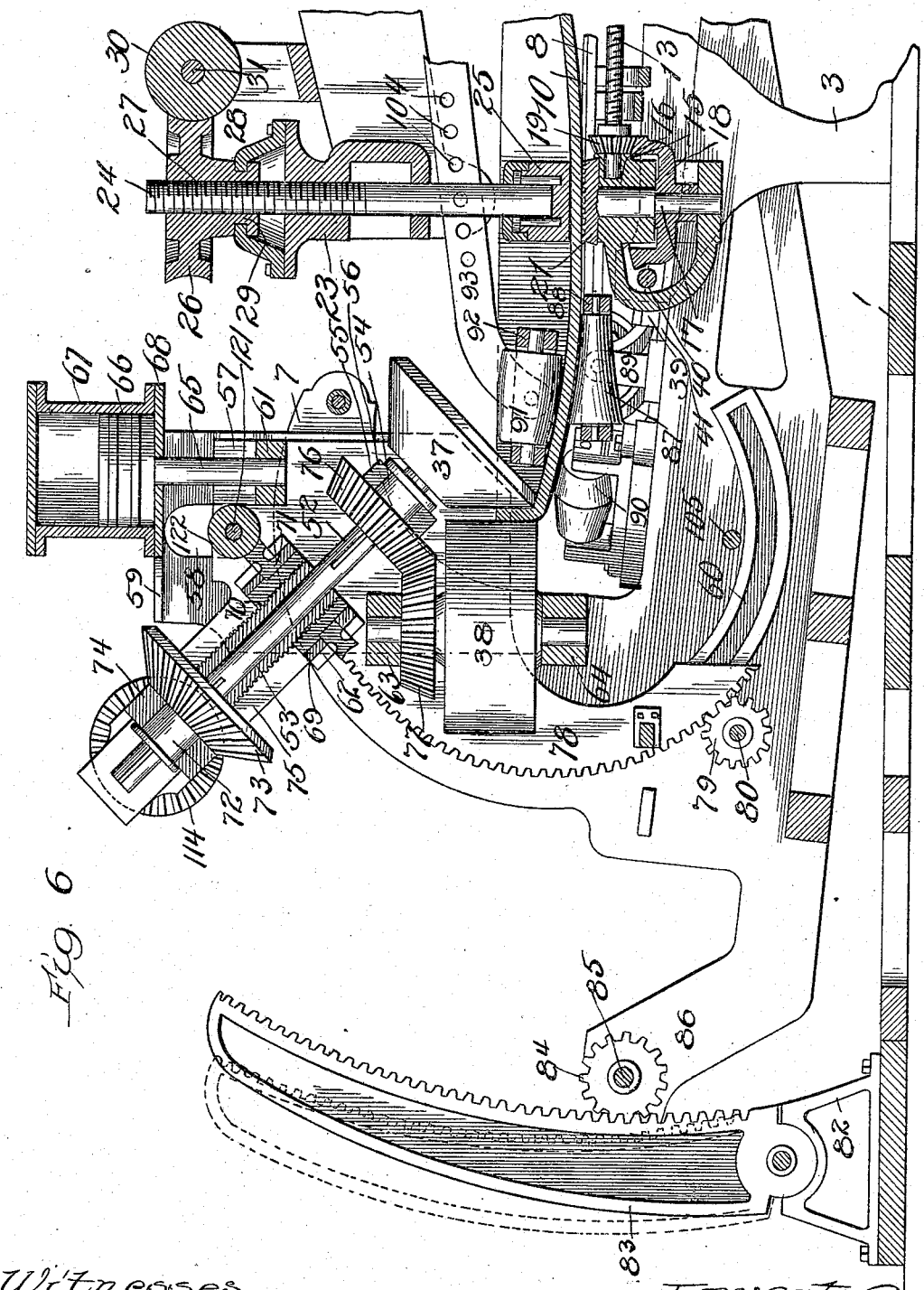

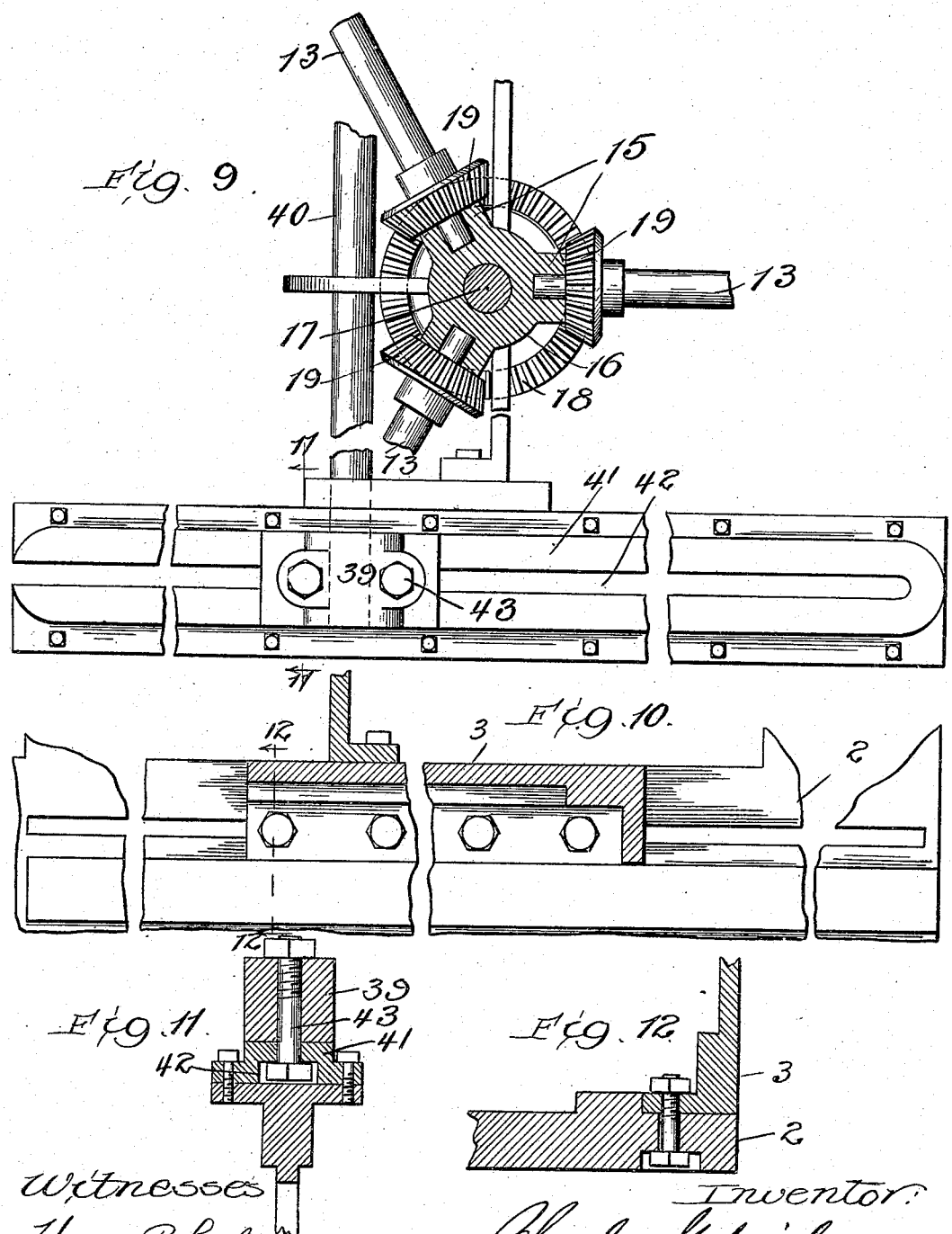

C. GABRIEL.
MACHINE FOR DISHING AND FLANGING PLATES.
APPLICATION FILED MAR. 20, 1908
942,062.
Patented Dec. 7, 1909.
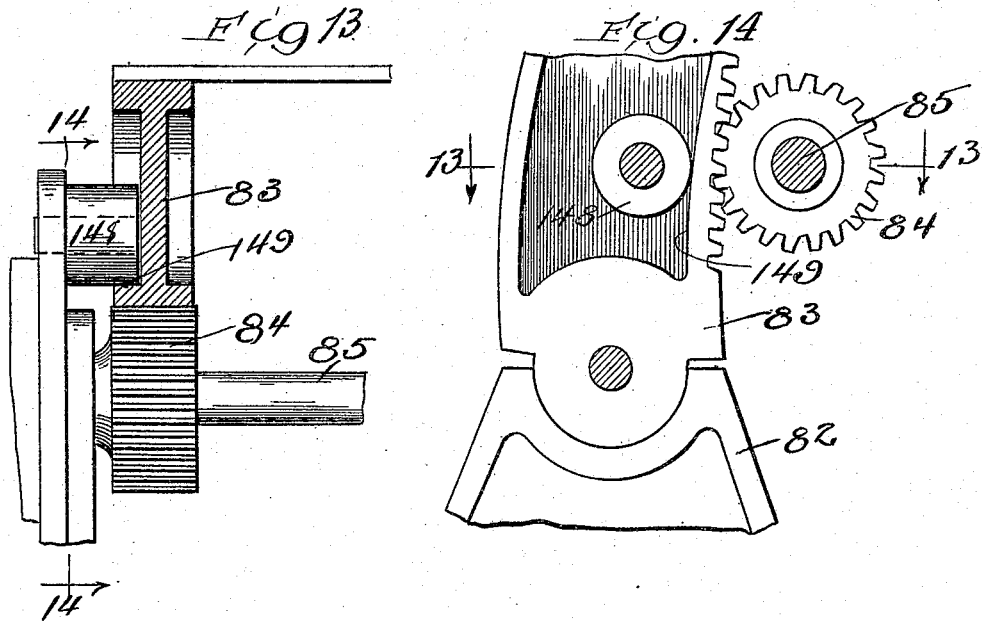
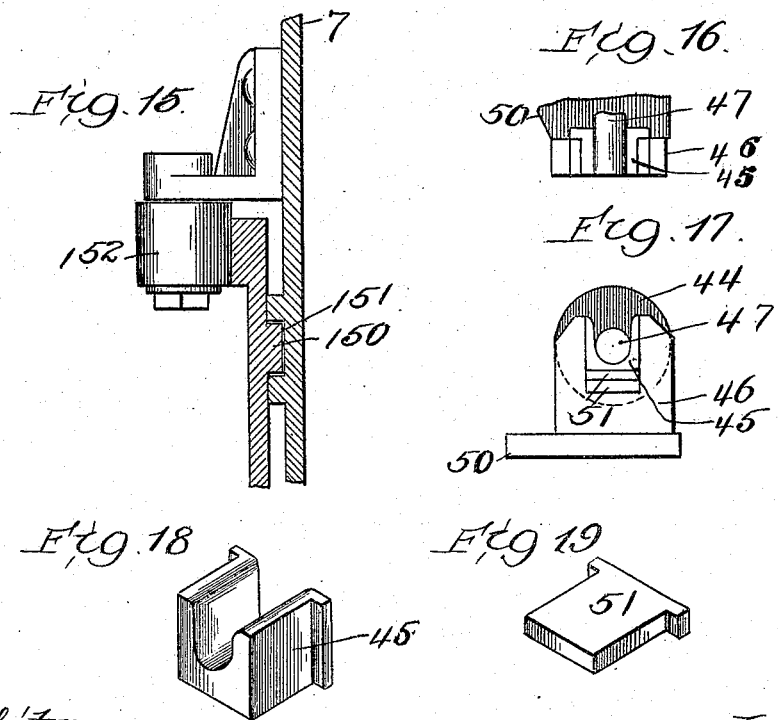

UNITED STATES PATENT OFFICE.

CHARLES GABRIEL, OF CHICAGO, ILLINOIS.

MACHINE FOR DISHING AND FLANGING PLATES.

942,062.   Specification of Letters Patent.   Patented Dec. 7, 1909.

Application filed March 20, 1908. Serial No. 422,271.

*To all whom it may concern:*

Be it known that I, CHARLES GABRIEL, a citizen of the United States, residing at Chicago, in the county of Cook, State of Illinois, have invented certain new and useful Improvements in Machines for Dishing and Flanging Plates; and I do hereby declare the following to be a full, clear, and exact description of the invention, such as will enable others skilled in the art to which it appertains to make and use the same.

This invention relates to a novel construction in a machine for dishing or flanging or both as desired large circular plates of great variation in diameter and thickness such as are used for the manufacture of boiler heads, the object being to provide a simple and efficient machine of this character which is easily operated and controlled, and consists in the features of construction and combinations of parts hereinafter fully described and claimed.

In the accompanying drawings illustrating this invention: Figure —1— is a top plan view of a machine constructed in accordance with my invention. Fig. —2— is a central vertical longitudinal section of the same. Figs. —3— and —4— are respectively side elevations of opposite sides of the machine. Figs. —5— and —6— are respectively fragmentary central vertical longitudinal sections on an enlarged scale showing the flanging and dishing mechanism in different positions. Fig. —7— is a detail plan section of an adjustable table employed for supporting rollers upon which the edge portion of the plate operated upon is supported. Fig. —8— is a detail section of a fourway valve employed. Fig. —9— is a fragmentary detail plan section showing the gearing employed to actuate plate centering devices, and showing also one of the side pieces of the frame. Fig. —10— is a fragmentary detail plan section of a part of the frame. Fig. —11— is a detail vertical section on the line 11—11 of Fig. —9—. Fig. —12— is a detail vertical section on the line 12—12 of Fig. —10—. Fig. —13— is a detail plan section on the line 13—13 of Fig. —14—. Fig. —14— is a detail vertical section on the line 14—14 of Fig. —13—. Fig. —15— is a detail vertical section on the line 15—15 of Fig. —4—. Fig. —16— is a fragmentary detail top plan view of a bearing in which the trunnions of plate supporting rollers are journaled. Fig. —17— is an end elevation of said bearing. Figs. —18— and —19— are detail perspective views of parts of said bearings. Fig. —20— is a fragmentary detail section showing reversing gear employed.

My present invention resides more particularly in the mechanism employed for dishing and flanging the boiler head and in the particular means employed for adjusting the position of that part of the machine upon which such mechanism is carried toward and away from the plate supporting and rotating mechanism of the machine in order to bring said first named portion or carriage into proper position to flange a boiler head of any diameter and thickness within certain prescribed limits.

The essential features of the invention will be pointed out at proper intervals in the specification to render them more intelligible.

The machine comprises two distinct main parts, one of which carries and rotates the head and is provided with proper centering means for said head, and the other of which carries flanging rolls, the dishing being effected partly by both said members as will be hereinafter fully pointed out.

The first named part of the machine is slidably mounted on the frame or bed plate and is adjustable toward and away from the other member, the latter being loosely supported on the frame or bed plate and pivotally connected with the first named part by means of adjustable pivots.

The machine comprises the bed plate 1 provided with parallel longitudinal guide rails 2 adjacent its side edges which extend from one end of said bed plate slightly beyond the middle thereof. The frame 3 consisting of parallel skeleton side plates secured together by means of suitable cross and lacing bars 4 and 5 respectively, is longitudinally movable on said bed plate and is held by said guide rails 2 against lateral movement thereon. Said side plates of said frame 3 are provided with longitudinal recesses or jaws 6 which determine the greatest radius of plate which the machine is adapted to operate upon. Hereafter I will term the frame 3 the jaw-frame for convenience. The mouth of the jaw opposes the frame 7 carrying the dishing rolls and disposed in the jaw are the means employed for clamping and rotating the plate.

Supported on the lower jaw of the frame 3 is the table 8 of skeleton form which projects from each side of the frame and provided with two radial guide slots 9 disposed at an angle of one hundred and twenty degrees to each other and to the longitudinal guide rails 10 disposed midway between the side plates of the frame 3 and parallel therewith. Guide rails 11 are also disposed on each side of each of said slots 9 and on said guide rails 10 and 11, shoes 12 are slidably disposed, the latter being provided with longitudinal threaded openings in which the screw-shafts 13 are received. The latter are journaled at their outer ends in bearings 14 mounted on the outer ends of said table 8 and the outer end of the frame 3, and at their inner ends are journaled in bearings 15 formed in a block 16 rigidly disposed upon the frame 3 midway between the side plates thereof and below the mouth portion of the jaw 6, said block being shown in detail in Fig. —9—. This block has a central vertical opening forming the bearing of the vertical shaft 17 which at its lower end loosely carries the cup-shaped bevel gear 18 with which bevel pinions 19 rigidly disposed on the inner end portions of said screw-shafts mesh, said cup-gear being driven by means of one of said screw-shafts and transmitting the motion to the others thereof.

The screw-shaft 13 extending longitudinally of the machine is preferably geared to a source of power in any suitable manner as, for example, by means of pulley 20. The said shaft 17 is of greater diameter at its upper than at its lower end portion and carries a head 21 at its upper end which is preferably rotatable thereon. The head 21 is loosely supported on the upper face of the block 16, its upper face being disposed flush with the upper faces of the guide rails 10 and 11 and it is adapted to support the plate 22 to be operated upon at the central portion of the latter. By means of said screw-shafts 13 the shoes 12, which are primarily disposed thereon so as to be equi-distant from the axis of the shaft 17, are moved longitudinally at equal speed and serve in a well-known manner to center the circular plate 22 to be operated upon, the said screw-shafts being reversible so as to impart movement to said shoes in either direction.

Mounted in the free ends of the upper jaws of the side plates, is a cross-head 23 provided with a vertical threaded opening disposed in axial alinement with the bearing of the shaft 17 and in which the vertical screw-shaft 24 is movable, the latter being provided at its lower end with a rotatable shoe 25 between which and the head 21 the plate 22 is securely clamped. Vertical movement is imparted to said shaft 24 by means of worm-wheel 26 having a central threaded opening 27 in which said shaft is received. Said worm-wheel is held against vertical movement relatively to the frame by means of the internally flanged segmental plates 28 the flanges of which enter the annular groove 29 in the hub of said worm-wheel, the said plates being bolted to the cross head 23. Meshing with said worm-wheel 26 is a worm 30 rigidly disposed upon the horizontal lateral shaft 31 which at one end carries a bevel gear 32, the latter meshing with two bevel gears 33 and 34 loosely mounted on the longitudinal shaft 35 suitably geared to a source of power, said gears 33 and 34 are alternately clutched rigid with the shaft 35 by means of a clutch 36 of well-known construction, said clutch being, however, so arranged as to admit of both the said gears being simultaneously maintained released. Thus it will be seen that the plate 22 is easily centered, and by then actuating the screw-shaft 24, it is clamped in place. The pitch of the worm 30 and of the worm-wheel 26 is such as to resist the slightest reverse movement of the screw-shaft 24 and consequently easing of the pressure on the plate. After thus clamping the plate the screw-shafts 13 are reversed and the shoes 12 thus thrown out of contact with the periphery of said plate.

It will be apparent, that before the foregoing operations are attempted, the relative positions of the frames 3 and 7 are properly adjusted in the following manner: Presuming that the plate 22 is exactly seven feet in diameter and of the maximum thickness of one inch and is to be provided with a six inch flange but is not to be dished, then the operator first adjusts the relative positions of the flanging rolls 37 and 38 so that their peripheries are exactly one inch apart. This is preferably done by inserting a piece of scrap of said thickness between the same, the roller 37 being raised and lowered to effect this in the manner hereinafter described. He then calculates the exact distance from the axis of rotation of the plate 22 to the nearest point in the periphery of said roll 37 necessary to flange said plate to the proper depth and inside diameter and moves the frame 3 accordingly either toward or away from the frame 7. It would obviously be necessary to provide suitable means, either hand or power actuated to impart movement to said frame 3 relatively to said bed plate 1, but such means are well-known and have consequently been omitted from illustration in order to avoid too great complexity in the drawings. The pivots of the frame 7 consist of a lateral shaft 40 journaled in bearings suitably supported in the side plates of the frame 3 and entering bearings 39 which are longitudinally movable on guides 41 on the upper faces of the extended portion 41ª of the side plates of the frame 7, said guides being provided with longitudinal slots 42 through which bolts 43 pass, the latter serving in a well-known manner to enable said bearings to be clamped rigid with said frame 3, as shown in detail in Figs. —9— —10— and —11—. Having properly adjusted the relative positions of the frames 3 and 7, the operator next adjusts the position of the idle supporting rolls 44 disposed on the frame 7, said rolls being provided with trunnions rotatable in the U-shaped bearings 45 which are loosely disposed in vertical recesses in the flanges of a U-shaped plate 46 rotatable on center pins 47 on the top plate of said frame 7, the latter being provided with slots 48 concentric with said center pieces and through which the bolts 49 pass, which also pass through openings in the horizontal flanges 50 of said U-shaped plate 46, said bolts serving to clamp said plates 46 rigid with said top plate (see Figs. 7, 16, 17, 18, and 19). The said idle rolls must be adjusted in position so that their axes are radially disposed relatively to the axis of the shaft 17. Said rolls are also rendered vertically adjustable by the insertion underneath the bearings 45 of plates 51, said bearings being provided with flanges at one end adapted to engage the inner faces of the vertical flanges of said U-shaped plate 46 for obvious reasons. Refer now to Fig. —2—. Having adjusted the positions of said idle rolls, the operator next raises the screw-shaft 24, moves the centering blocks or shoes 12 to the outer limits of their movement, and raises the roll 37, this being accomplished in the following manner: The said roll 37 is rigid with the shaft 52 which is rotatable in a hollow screw-shaft 53, and slidable in a sleeve 54 journaled in a bearing 55 disposed midway between the ends of a cross-bar 56 connecting the parallel side plates 57 movable in guide slots 58 in the side plates of a frame 59 which is in turn movable on guides 60 disposed substantially concentric with the meeting point of the outermost point in the periphery of the roll 37 with the periphery of the roll 38, said point being variable according to the variations in thickness of the plate interposed between said rolls. Said side plates 57 are further connected with each other by means of cross bars 61, 62, 63, and 64, said cross bar 61 being connected with the piston rod in the cylinder 67 mounted on the cross plate 68 connecting the side plates of the frame 59. The cross bar 62 is provided midway between its ends with a bearing 69 in which the hub 70 of the worm-wheel 71 is journaled, said hub 70 being internally threaded and receiving said hollow screw-shaft 53. The latter is suitably held against rotation so that when said worm-wheel 71 is rotated, the said screw-shaft will be moved longitudinally, and the latter is further suitably held against longitudinal movement relatively to said shaft 52 to transmit longitudinal movement thereto. The said shaft 52 is also longitudinally movable in the hub 72 of a bevel gear 73, said hub being journaled in a bearing between the ends of a cross-bar 74 connecting the free ends of two projections 75 of said side plates 57, said sleeve 54 previously referred to, constituting the hub of the bevel gear 76 rotatably rigid with relation to the roll 37. The bevel gear 77 is rigid with the roll 38 the trunnions of the latter being journaled in bearings between the ends of said cross-bars 63 and 64. To raise said roll 37 so as to provide ample space for the insertion of the plate 22 to be flanged, the operator causes the worm-wheel 71 to be rotated in a direction to impart upward movement to the screw-shaft 53 and thereby to the shaft 52 carrying said roll 37. Said side plates of said frame 59 terminate in segmental projections 78 having toothed outer edges constituting the same segmental racks which are concentric with said guides 60 and mesh with pinions 79 on a lateral shaft 80 journaled in bearings in the side plates of the frame 7 and by means of which pinions said frame 59 is rotated on said guides 60. The plate 22 is now taken from the furnace, laid upon the table 8 and centered by actuating said shoes 12. This being accomplished the screw-shaft 24 is lowered and brought to bear on said plate and the shoes 12 are then reversed to release the periphery of the plate. Worm-wheel 71 is next actuated so as to lower the shaft 52 and bring the miter surface of the roll 37 to bear upon the peripheral portion of the upper face of said plate. The shaft 52 is then rotated thereby also rotating the roll 38 through the meshing of bevel gears 77 and 76 and imparting rotary movement to said plate 22. While so rotating the latter the shaft 80 is actuated and slowly causes the frame 59 to be turned through an arc of ninety degrees thereby causing the axis of the roll 38 to become vertically disposed and likewise bending or practically spinning up the edge portion of the plate 22 to a vertical position and constituting the same an annular flange 81 of said plate. This having been accomplished the operator next raises the side plates 57 and parts carried thereby by admitting compressed air to the lower chamber of the cylinder 67 thereby withdrawing the rolls 37 and 38 from engagement with said flange 81. Shaft 24 is then raised and the flanged plate removed, the operations being repeated for each plate of the lot to be flanged.

If the plate is to be dished and flanged, the primary operations up to the insertion of the plate and the engagement thereof by the rolls 37 and 38 are repeated but before flanging said plate the following operations are necessary, reference being now had to Fig. —6—. Upon the rear end of the bed plate of the machine are two standards 82 upon which the oscillating segmental racks 83 are mounted, the latter being vertically disposed and meshing with the pinions 84 on the shaft 85 journaled in bearings in the free ends of projections 86 of the frame 7. Said projections 86 carry idlers 148 at their free ends which move in recesses in the outer faces of the racks 83 and engage the rear edges of the tooth faces of the latter thereby maintaining said racks in mesh with said pinions 84. By actuating said shaft 85 said frame 7 will be turned on its pivot. In so doing the edge portion of the plate 22 is raised while being also rotated. When said edge portion has been raised the required height above its original plane to provide the requisite depth of dish the shaft 85 is stopped and an idle cone roll 87 having a concave face corresponding in radius with the radius of the dish to be imparted is slipped into the bearings provided therefor in a swinging frame 88 having trunnions disposed transversely to the axis of said roll 87 and journaled in bearings in standard 89 supported on the upper edges of the side plates of the frame 7. The idle rolls 44 are also removed and replaced by cone rolls 90 properly adjusted to support the now raised edge portion of the plate. A cone roll 91 having a double convex face of proper contour to conform to the radius of the dish to be imparted is journaled in bearings in a rocking frame 92 having trunnions disposed transversely to the axis of said roll 91. These trunnions are journaled in bearings in the free ends of the side bars 93 pivotally mounted between their ends on the free ends of the upper jaws of the frame 3, the other ends of said bars being pivotally secured to the arms of an inverted T-shaped member 94. The vertical arm of this member is threaded to engage the internally threaded hub of the worm-wheel 95 supported and actuated in the same manner as said worm-wheel 26 through the intermediacy of the worm 96 on a shaft 97 geared by means of the bevel gear 98 to the bevel gears 99 and 100 on the shaft 35. The said beveled gears 99 and 100 are loose on said shaft 35 and are adapted to be alternately clutched rigid therewith to drive said shaft 97 in opposite directions by means of the clutch 101. The horizontal arms of said member 94 pass through the longitudinal slots 102 in the said bars 93 and enter vertical guide grooves 103 in the inner faces of the side plates of the upper jaws of the frame 3. The pivotal connections of the said bars 93 with the jaws are capable of adjustment by passing the pivot pins through either of the series of openings 104, thus enabling the forward ends of said side bars 93 to be projected various distances in accordance with the variations in diameter of heads to be operated upon. The head having thus been dished, the flanging operation is now performed and the completed head is then removed.

All of said mechanism carried by the portion 7 of the machine is operated from a single drive-shaft 105 which is suitably geared to an electric motor, preferably, though any other source of power may be used. The gearing employed is relatively difficult of comprehension, and I will, therefore, describe the same in accordance with the successive operations of dishing and flanging a boiler head. After centering the head, the primary operation of lowering the frame 57 effected by means of cylinder 67 and piston 66 is accomplished by means of the four way valve 106 interposed in the connections between said cylinder 67 and a source of supply of compressed air and an exhaust, said four way valve being well known and requiring no special description. The next succeeding operations consisting in rotating the head and at the same time turning the frame 7 on its pivot, are accomplished as follows: The shaft 105 carries a spur-gear 107 rigid therewith which meshes with the drive pinion on the motor shaft which is not shown. At one end said shaft carries a rigid bevel pinion 108 which meshes with the bevel gear 109 rotatably rigid on countershaft 110. The latter is preferably provided with a key way, said gear 109 is slidable thereon but is maintained always in mesh with said pinion 108. Adjacent its other end said shaft 110 carries a gear 111 which is rotatably rigid therewith but slidable thereon. Said bevel gear 111 meshes with the bevel gear 112 rigid on the shaft 113 which carries the bevel gear 114 meshing with the bevel gear 73, by means of which the shaft 52 and the bevel gears 76 and 77 are driven and thus the plate rotated, as hereinbefore described. Said bevel gear 112 also meshes with the bevel pinion 115 rigid with the shaft 116 journaled in bearings 117 mounted on the extended portion 75 of one of the side plates of said frame 57, and which carries two loose opposing bevel pinions 118 and 119 between which a suitable clutch rotatably rigid with said shaft 116 is disposed and by means of which either of said pinions is clutched rigid with said shaft. Said pinions 118 and 119 mesh with the bevel gear 120 on the shaft 121 which carries the worm 122 meshing with the worm wheel 71 by means of which the miter roll 37 is adjusted in position relatively to the roll 38 as hereinbefore described. Thus it will be seen that the shaft 110 and said rolls 37 and 38 are constantly driven so long as the motor runs, particular attention being directed to the fact that said gears 109 and 111 have hubs which are journaled in bearings in the free ends of the arms of yokes 123 and 124 which are pivotally mounted on one side plate of the frame 7 and the extended portion 75 of one side plate 57 respectively, there being sleeves 125 keyed on said shaft 110 and moving in the bearings in the free ends of the other arms of said yokes. The yoke 123 is pivoted concentric with the shaft 105 and yoke 124 with shaft 113. At its other end said shaft 105 carries a bevel gear 126 meshing with a bevel gear 126$^a$ rigid on a countershaft 127 journaled in bearings on the other side plate of the frame 7. Between its ends said shaft 127 carries two loose bevel pinions 128 and 129, either of which may be clutched rigid with said shaft by means of the clutch 130. Both said pinions mesh with the bevel gear 131 on the vertical shaft 132 carrying the spur gear 133. This in turn, meshes with a spur gear 134 (Fig. —1—) on a shaft 135 which carries the worm-wheel 137 on the shaft 80. Thus, by operating said clutch 130, said shaft 80 is rotated in either direction to either raise or lower the frame 57. Refer now to Fig. —20—. At its other end, said shaft 127 carries a bevel pinion 138 rigid thereon and meshing with the idle bevel gear 139 which in turn meshes with the bevel pinion 140 which is loose on the shaft 141. The latter is concentric with the shaft 127 and is provided with a longitudinal groove or keyway. A friction clutch member 142 is mounted on said shaft 141 and is provided with a projection or key 143 movable in said keyway and serving to hold said member rotatably rigid with said shaft. At its ends said member 142 is provided with tapered recesses or cups 144 in which the tapered projections 145 on the gears 138 and 140 are received and engaged. Said shaft 141 is rotated in either direction, as, when the member 142 is thrown into engagement with the projection of gear 138, said shaft 141 will rotate with said gear and when thrown to engage the projection of gear 140 it will be rotated in the opposite direction by the latter. Said shaft 141 carries the worm 146 meshing with the worm-wheel 147 on the shaft 85 by means of which the frame 7 is turned on its pivot, the pinions 84 on the latter being maintained in mesh with the oscillating racks 83 by means of idlers 148 (Fig. —13—) engaging the rear faces 149 of the rack bars proper.

The racks 78 of the frame 59 are guided as shown in Fig. —15— by means of segmental guide ribs 150 thereon entering the segmental guide grooves 151 in the side plates of frame 7 and are held against lateral displacement by the latter and by the idlers 152 disposed in operative relation thereto in any suitable manner.

I claim as my invention:

1. In a machine of the kind specified, a supporting frame equipped with means for rotatably clamping a plate therein, a frame pivotally supported thereon at one end, said frames being movable toward and away from each other to vary the position of the pivot on said last-named frame, an oscillating frame carried by said pivoted frame, and driven rolls carried by said oscillating frame and engaging the edge portion of the plate to rotate the latter, said pivoted and oscillating frames being independently operable to distort the body and edge portions of the plate respectively.

2. In a machine of the kind specified, a supporting frame equipped with means for rotatably clamping a plate therein, a frame pivotally supported thereon at one end, said frames being movable toward and away from each other to vary the position of the pivot on said last-named frame, an oscillating frame carried by said pivoted frame, and driven rolls carried by said oscillating frame and engaging the edge portion of the plate to rotate the latter, the faces of said rolls being adjustable toward and away from each other to accommodate plates of various thickness.

3. In a machine of the kind specified, a supporting frame equipped with means for rotatably clamping a plate therein, a frame pivotally supported thereon at one end, said frames being movable toward and away from each other to vary the position of the pivot on said last-named frame, an oscillating frame carried by said pivoted frame, a driven cylindrical roll carried by said oscillating frame on which the edge portion of the plate rests, a driven miter roll having its axis disposed at an angle of forty-five degrees to the axis of said cylindrical roll and being geared to the latter, said miter roll being adjustable longitudinally of its axis and having one point in its face moving in a plane parallel with the face of said cylindrical roll, said miter roll engaging the upper face of the plate, and means for actuating said pivoted and oscillating frames independently of each other to distort the body and edge portion respectively of said plate.

4. In a machine of the kind specified, a plate supporting frame, means for rotating the supporting frame, a frame carrying bending rolls adapted to engage said plate, said last-named frame being pivotally supported on said first-named frame, and said last-named frame being adapted to be raised and lowered at its free end portion, the said pivot being adjustable to change the radial distance of the bending rolls therefrom, upright vertical racks pivotally mounted on the base plate of the machine, pinions on said last-named frame engaging said rack, and coacting means on said rack and said last-named frame maintaining said rack and pinion in mesh.

5. In a machine of the kind specified, a frame carrying plate supporting and rotating means, a frame carrying bending rolls and movable with relation to said first-named frame to vary the distance of said bending rolls from the axis of rotation of the plate, a pivotal connection between said frames adjustable with relation to said frame carrying said bending rolls and rigid with relation to said first-named frame, upright pivotally supported racks disposed on the base plate of said first-named frame, pinions carried by the last-named frame and meshing with said racks, and coacting means on said last-named frame and said rack bars maintaining the latter and said pinions in mesh.

6. In a machine of the kind specified, a frame carrying plate supporting and rotating means, a frame carrying bending rolls and movable with relation to said first-named frame to vary the distance of said bending rolls from the axis of rotation of the plate, a pivotal connection between said frames adjustable with relation to said frame carrying said bending rolls and rigid with relation to said first-named frame, upright pivotally supported racks disposed on the base plate of said first-named frame, pinions carried by the last-named frame and meshing with said racks, and coacting means on said last-named frame and said rack bars maintaining the latter and said pinions in mesh, a frame rotatable on its own axis carried by said last-named frame and supporting the bearings of the bending rolls.

In testimony whereof I have signed my name in the presence of two subscribing witnesses.

CHARLES GABRIEL.

Witnesses:
 RUDOLPH WM. LOTZ,
 ALBERT W. NEWCOMB.